(12) United States Patent
Schmidt et al.

(10) Patent No.: US 8,830,793 B2
(45) Date of Patent: Sep. 9, 2014

(54) SYSTEM AND METHOD FOR COLLISION AVOIDANCE IN UNDERWATER VEHICLES

(75) Inventors: Henrik Schmidt, Norfolk, MA (US); Michael Benjamin, Reading, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 211 days.

(21) Appl. No.: 13/536,037

(22) Filed: Jun. 28, 2012

(65) Prior Publication Data

US 2014/0003193 A1 Jan. 2, 2014

(51) Int. Cl.
  *G01S 15/93* (2006.01)
  *G01S 3/80* (2006.01)
  *G01S 11/14* (2006.01)

(52) U.S. Cl.
  CPC . *G01S 15/93* (2013.01); *G01S 3/80* (2013.01); *G01S 11/14* (2013.01)
  USPC .............................................. 367/131; 367/88

(58) Field of Classification Search
  CPC ............ G01S 15/93; G01S 11/14; G01S 3/80
  USPC .............. 367/88, 131; 702/143; 701/301, 302
  See application file for complete search history.

(56) References Cited

U.S. PATENT DOCUMENTS

2014/0003193 A1\* 1/2014 Schmidt et al. ................. 367/88

OTHER PUBLICATIONS

F.B. Jensen; W. A. Kuperman; M.B. Porter; H. Schmidt; Computational Ocean Acoustics, Springer, New York, NY 1994, pp. 14-16.

\* cited by examiner

*Primary Examiner* — Daniel Pihulic
(74) *Attorney, Agent, or Firm* — Peter A. Nieves; Sheehan Phinney Bass + Green PA

(57) ABSTRACT

A system for providing collision avoidance in underwater vehicles contains a spectral analysis module for determining expectation value of acoustic (incoherent) intensity. The system also contains an intercept time estimation module for: receiving continuous time series of a current incoherent acoustic intensity and low pass filtering the time series of the current incoherent acoustic intensity; estimating temporal intensity rate of change; determining an estimated time to collision for an approaching source; and performing statistical regression analysis resulting in an estimated time of potential collision and an uncertainty measure.

20 Claims, 7 Drawing Sheets

US 8,830,793 B2

SYSTEM AND METHOD FOR COLLISION AVOIDANCE IN UNDERWATER VEHICLES

FIELD OF THE INVENTION

The present invention is generally related to underwater surveillance, and more particularly is related to detecting and avoiding collisions in underwater vehicles.

BACKGROUND OF THE INVENTION

The use of autonomous underwater vehicles (AUV) is expanding exponentially for a wide range of undersea mapping, monitoring and surveillance missions. As is the case for manned submarines, the sensing capabilities of AUVs are in general limited to acoustic sensing using onboard sonar systems, such as side scan or synthetic aperture sonars for seabed mapping, multi-beam sonars for bathymetry assessment, or forward looking sonars for obstacle avoidance or feature search. FIG. 1 is a prior art schematic diagram illustrating AUVs 2, 4 performing surveys in littoral environments with heavy ship 10, 12 traffic.

With the exponential increase in use of AUVs for both military and civilian applications over the last couple of decades, there has been a growing list of incidences involving destruction or heavy damage as a result of collisions between AUVs and surface craft. Specifically, there are several historical examples of accidents involving collision between AUVs and surface vessels, in particular in shallow littoral regions with heavy surface traffic, such as shipping channels, with the almost universal result of a total loss of the small AUVs. Due to extreme cost associated with AUVs, it is important to prevent damage and/or total loss.

In contrast, manned submarines have a variety of passive and active sonars available to the operators, and experienced sonar operators are extremely capable of identifying the sound signatures of approaching surface vessels, and estimate their speed, location, and heading, enabling the submerged platform to take action to avoid a collision. Unfortunately, these advantages are not available in AUVs.

Thus, a heretofore unaddressed need exists in the industry to address the aforementioned deficiencies and inadequacies.

SUMMARY OF THE INVENTION

Embodiments of the present invention provide a system and method for providing collision avoidance in an underwater vehicle. Briefly described, in architecture, one embodiment of the system, among others, can be implemented as follows. The system contains a spectral analysis module for determining expectation value of acoustic (incoherent) intensity. The system also contains an intercept time estimation module for: receiving continuous time series of a current incoherent acoustic intensity and low pass filtering the time series of the current incoherent acoustic intensity; estimating temporal intensity rate of change; determining an estimated time to collision for an approaching source; and performing statistical regression analysis resulting in an estimated time of potential collision and an uncertainty measure.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

The present invention provides a system and method that provides an autonomous underwater vehicle (AUV) with the capability of detecting an approaching surface craft and providing a conservative estimate of interception time with a bearing of the approaching surface craft so as to allow the AUV to take evasive action if necessary. If evasive action is necessary, in accordance with one embodiment of the invention, the present system and method provides for relocation of the AUV to an alternative destination or to take an alternative path. The present system and method may be easily integrated into an AUV and uses either a single hydrophone, or in accordance with an alternative embodiment, an acoustic vector sensor, providing a bearing, in either case allowing the AUV to take evasive action.

Figure 1:
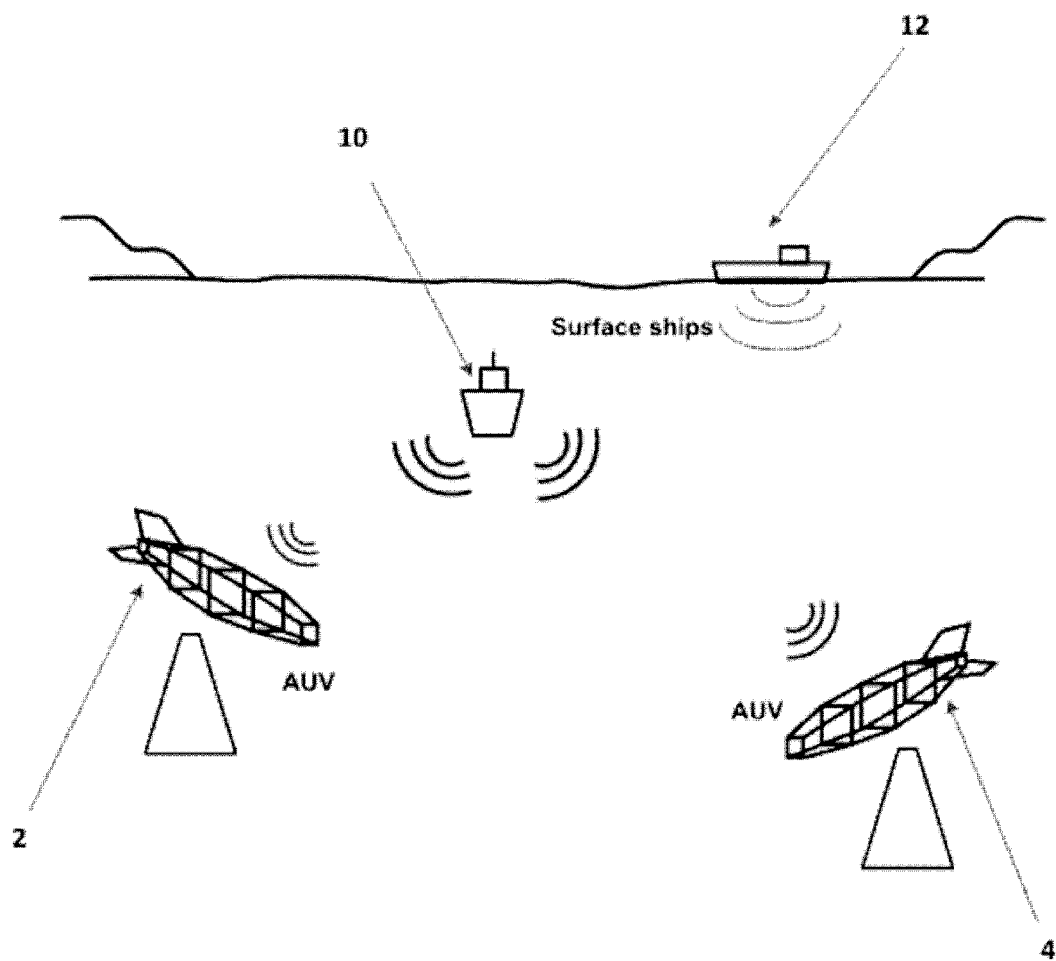
FIG. 1 is a prior art schematic diagram illustrating AUVs performing surveys in littoral environments with heavy ship traffic.
Figure 2:
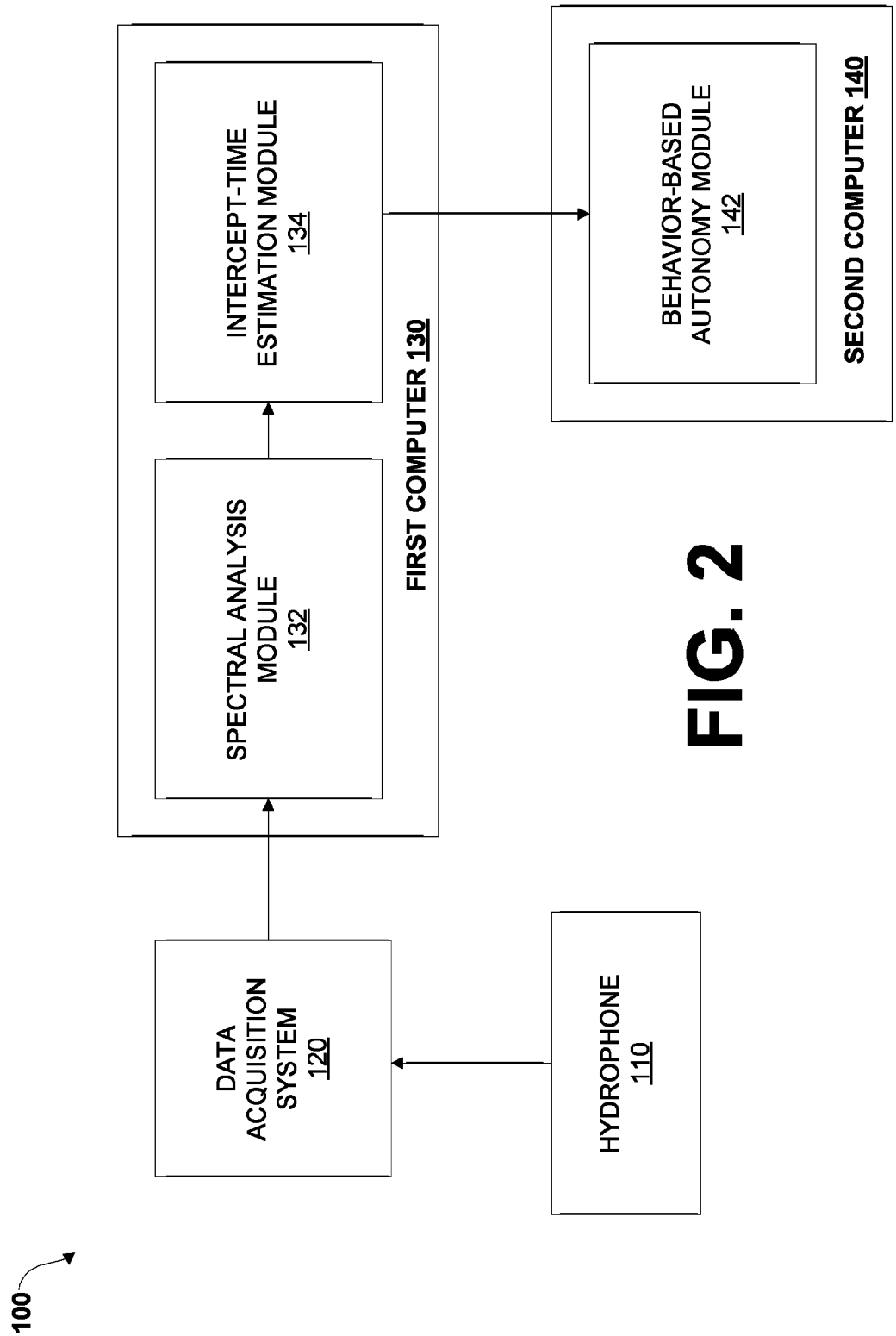
FIG. 2 is a schematic diagram illustrating an example of a collision avoidance system in accordance with the present invention.

FIG. 2 is a schematic diagram illustrating an example of the present collision avoidance system 100 for providing collision avoidance in AUVs. As shown by FIG. 2, the collision avoidance system 100 contains a hydrophone 110 for detecting underwater sound. The hydrophone 110 is connected to a data acquisition system 120. For exemplary purposes, the data acquisition system 120 may be, but is not limited to, a single channel data acquisition system. The data acquisition system 120 digitizes analog signals received from the hydrophone 110 and generates a digital timeseries.

The collision avoidance system 100 also contains a first computer 130 containing a spectral analysis module 132 and an intercept-time estimation module 134. The spectral analysis module 132 performs spectral analysis of the continuous acoustic pressure timeseries, generating an estimate of current power spectral density. The estimate of the current power spectral density is integrated over the operational frequency band characteristic for surface ships to generate a robust estimate of the current incoherent acoustic intensity. It should be noted that the operational frequency band characteristic for surface ships is typically in the range of 100-1000 Hz, although the present invention is not limited to this range. Ignoring dissipation, the expection value of the current incoherent acoustic intensity, expressed in decibel (dB) will decay with range as illustrated by equation 1.

$$I_{dB} = I_0 - 10\log_{10}(r) = I_0 - \frac{10\log(r)}{\log(10)} \quad \text{(Eq. 1)}$$

In equation 1, $I_0$ represents a constant determined by the depth and strength of the source (i.e., surface ship).

The intercept-time estimation module 134 receives the continuous timeseries of the intensity and low-pass filters the same, after which temporal intensity rate of change, or change rate, is estimated. An example of a way to estimate rate of change is provided by equation 2. For a source presently at range r and moving towards an AUV containing the present collision avoidance system 100 at speed v, the temporal intensity change rate $\Delta$ is represented as follows.

$$\Delta = \frac{dI_{dB}}{dt} = \frac{\partial I_{dB}}{\partial r}\frac{dr}{dt} = -v^* \frac{\partial I_{dB}}{\partial r} = \frac{10v}{\log(10)r} \quad \text{(Eq. 2)}$$

In equation 2, $I_{dB}$ is the current intensity of the noise and $$\frac{dI_{dB}}{dt}$$

represents how fast the intensity changes with time. This is equal to the partial derivative of the current intensity with range times the change in range with time.

Denoting the estimated time to collision for the approaching source dT, equation 3 is derived from equation 2.

$$dT = r/v = \frac{10}{\log(10)\Delta} \quad \text{(Eq. 3)}$$

Equation 3 states that the estimated time to collision with the approaching source is inversely proportional to the time derivative of the current incoherent acoustic intensity. The functionality of both equations 2 and 3 is performed by the intercept-time estimation module 134.

The estimated time to collision is sensitive to the natural fluctuations of both the ambient noise and the signal from the approaching source. Even though the bandwidth of the system provides a significant smoothing effect on the fluctuations in the estimated acoustic intensity, to achieve a reliable estimate, a statistical regression analysis is performed by the intercept-time estimation module 134, resulting in an estimated time of potential collision, and also an uncertainty measure, such as the standard deviation or the 95% confidence interval.

The estimated collision time based on measurement number n is represented by equation 4, as illustrated below.

$$T_n^{ETA} = T + dT_n \quad \text{(Eq. 4)}$$

A robust estimate of collision time is generated by creating a running average of the last N collision time estimates (also referred to as a regression analysis process), where N is a configurable parameter, with the confidence in the estimate supported by a statistical confidence measure such as the standard deviation or a 95% confidence interval, to be used by a behavior-based autonomy module 142 (described hereinafter) for decision making, or in a diver version to trigger an audible alarm.

The estimated collision time of the intercept-time estimation module 134 is a conservative measure because it is assumed that the source is on a collision course, which it may not be. Further, ignoring dissipation will underestimate the true intercept time, because increased dissipation will increase the range derivative of the intensity and therefore yield a shorted time to collision through equation 3. Also, the estimate is robust to the presence of multiple sources, because the intensity rate is dominated by a close source due to the inverse proportionality with range.

The estimates and statistics are packed into a National Marine Electronics Association (NMEA) string by the intercept-time estimation module 134, which is then passed at regular time intervals to a second computer 140 containing the behavior-based autonomy module 142. It should be noted that a regular time interval may be different in alternative environments. As an example, where a source may be a cargo ship, sampling once every 5 seconds may be appropriate and a regular time interval may be every 5 second. Alternatively, for speed boats a shorter regular time interval is necessary. The estimates and statistics may be passed via one of many different communication means, such as, but not limited to, a serial link or an Ethernet socket.

The behavior-based autonomy module 142 analyzes the received estimates and statistics, and through dedicated behaviors, instructs the AUV to take evasive action appropriate to the current mission of the AUV. Such evasive action could be to change depth or in the case of a AUV operating in a known shipping channel, to simply interrupt the mission and move out of the channel to await passage of the surface ship, and then resume the mission once the ship has passed.

The following provides an example of evasive action procedures taken by an AUV where the AUV is conducting a search or survey mission in a known shipping channel and may reasonably assume that an approaching collision hazard is a ship that will operate solely in the shipping channel. This example also assumes that the AUV may safely operate in some areas outside the shipping channel as a way of operating safely while the shipping hazard persists. This procedure is referred to herein as the safe-zone procedure.

Figure 7:
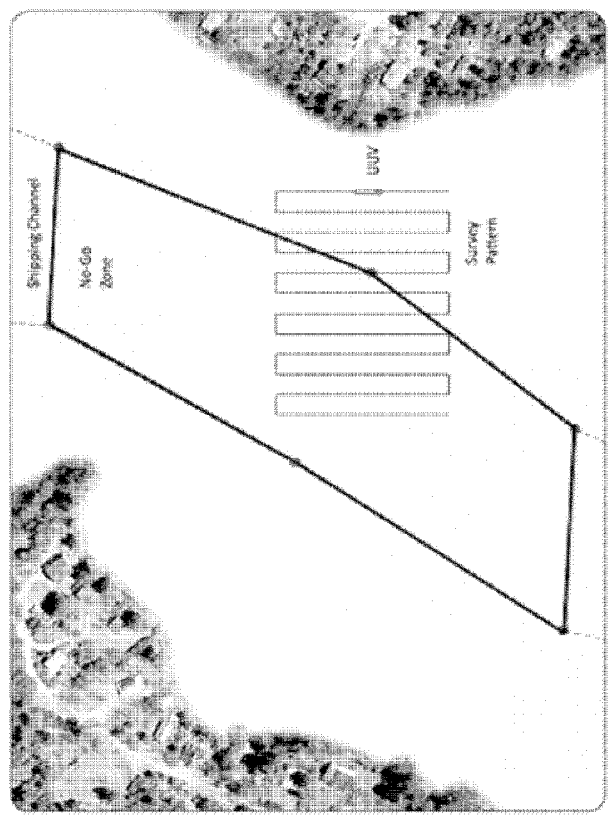
FIG. 7 is a schematic diagram illustrating how by picking a region of AUV operation, the shipping channel may be cropped to a distinct polygon in local coordinates.
Figure 6:
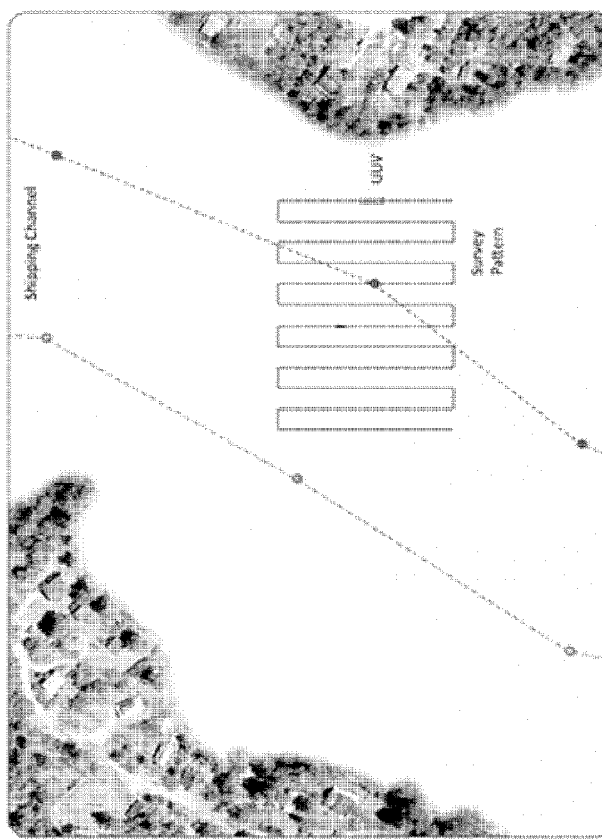
FIG. 6 is a schematic diagram illustrating an exemplary shipping channel and the survey pattern of an AUV.

Operation in a shipping channel is an important subclass of situations where an AUV may need to maneuver to avoid collisions with surface vehicles. The area designated outside a shipping channel represents a region with a sharply reduced (if not zero) likelihood for the presence of a ship. A waterway with a shipping channel is typically marked with buoys. FIG. 6 is a schematic diagram illustrating an exemplary shipping channel and the survey pattern of an AUV. By picking a region of AUV operation, the shipping channel may be cropped to a distinct polygon in local coordinates, as illustrated by the schematic diagram of FIG. 7. When a collision alarm has been received by the present invention, the polygon may be temporarily regarded as a no-go zone and the path of the AUV may be adjusted accordingly.

In accordance with the present invention, to mitigate the risk of collision, a number of safe zones outside the shipping channel, nearby to the survey area, are designated. Each of these safe zones may be represented by a simple polygon around which the AUV may traverse or loiter until it is safe to return. Use of a small set of safe zones is preferred to letting the AUV heuristically find its own loiter point outside the channel. The safe zones provide a degree of predictability to the operator, and they allow for simple, terse messages from the AUV to the operator to communicate the disruption in the mission. The safe zones are chosen to be far enough out of the channel to reduce collision risk, and close enough to allow the AUV to assess collision risk via the present system. Preferred minimal criteria for safe zone placement is that there be one on either side of the channel. It is noted, however, that there is no requirement for safe zones to be on either side of the channel. Once the present system determines it is safe to return, the AUV resumes its search pattern. It should be noted that the safe zones may be predefined and stored within a memory of the present system, or in an alternative location.

In accordance with the first exemplary embodiment of the invention, where the present invention is not equipped with a vector sensor, and does not provide bearing information, the basic strategy is to proceed to the nearest safe zone when the collision risk surpasses a threshold set by the operator. Alternatively, the AUV may be programmed to proceed directly to the nearest outer edge of the no-go zone and traverse from that point to the nearest safe zone.

In accordance with the second exemplary embodiment of the invention, where the present system is equipped with a vector sensor, a rough bearing estimate of the source may be provided, along with the time-to-collision estimate from the present system. In this case the bearing information may be used to estimate a closest point of approach (CPA) for each of the trajectories to each of the safe zones. The safe zone could then be chosen that has the minimum estimated CPA. Steps taken may include: a) determine the survey pattern; b) determine a number of safety zones for retreat, some on either side of the shipping channel; c) upon alert by the present invention in accordance with the first exemplary embodiment, proceed to the closest safety zone and loiter; d) upon alert by the present invention in accordance with the second exemplary embodiment of the invention, proceed to the safety zone that minimizes the closest point of approach between the AUV and the collision hazard; and e) after the present invention indicates all-clear, return to the survey pattern.

In accordance with an alternative embodiment of the invention, to mitigate the risk of collision, the present system may modify and crop the AUV survey pattern to contain only legs and waypoints outside the no-go zone, when the alarm of the present system indicates a risk of collision. This alternative embodiment for the AUV seeking safety is also referred to herein as survey pattern cropping. This is only appropriate when the survey pattern is partially contained in the no-go zone, as shown in the schematic diagram of FIG. 7. In the case where the original survey pattern, or the un-traversed portion of the original survey pattern, is wholly inside the no-go zone, the safe-zone procedure previously described may be used instead.

Figure 9:
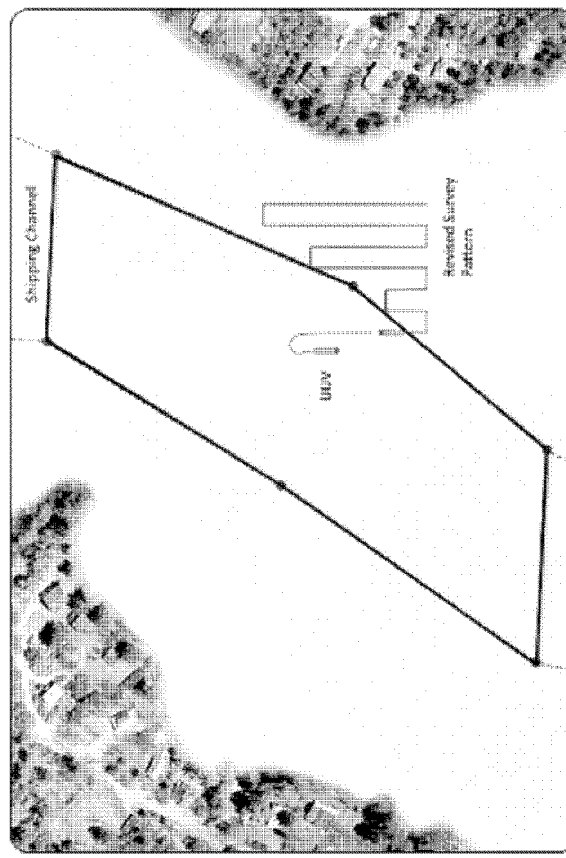
FIG. 9 is a schematic diagram illustrating a revised original AUV survey pattern in accordance with the survey pattern cropping process.
Figure 8:
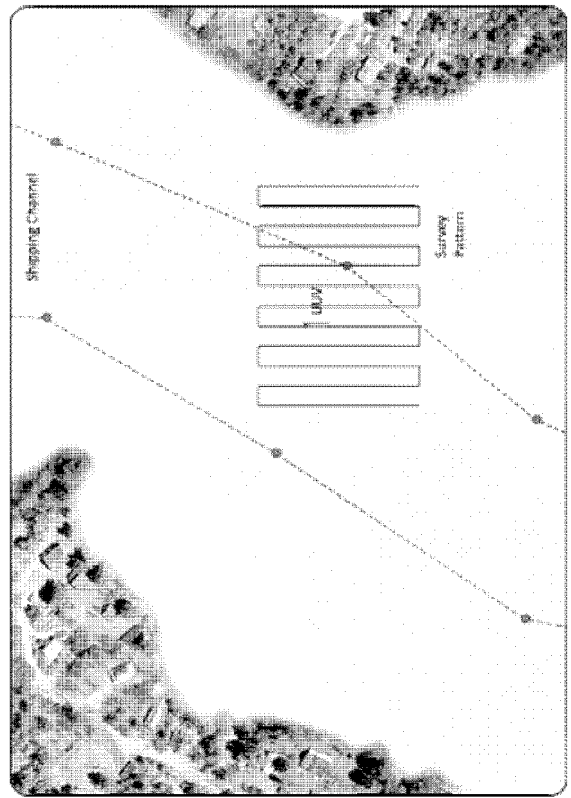
FIG. 8 is a schematic diagram illustrating an exemplary shipping channel and the survey pattern of an AUV.

Steps taken in accordance with the survey pattern cropping procedure may include: a) determining a survey pattern; b) if the present system produces an alert, surveying the original pattern as originally specified; c) upon the first system collision alert, splitting the survey pattern into two or more patterns where each pattern is either whole in or wholly out of the no-go zone, where all survey patterns taken together constitute the same survey area as the original pattern; d) when the present system indicates a collision risk, proceeding to the closest sub-pattern outside the no-go zone currently not completely searched; and e) after the present invention indicates all-clear, returning to complete the remaining portion of the survey pattern(s) in the no-go zone. FIG. 9 provides an example of a revised original AUV survey pattern in accordance with the survey pattern cropping process, while FIG. 8 illustrates the original survey pattern.

Figure 3:
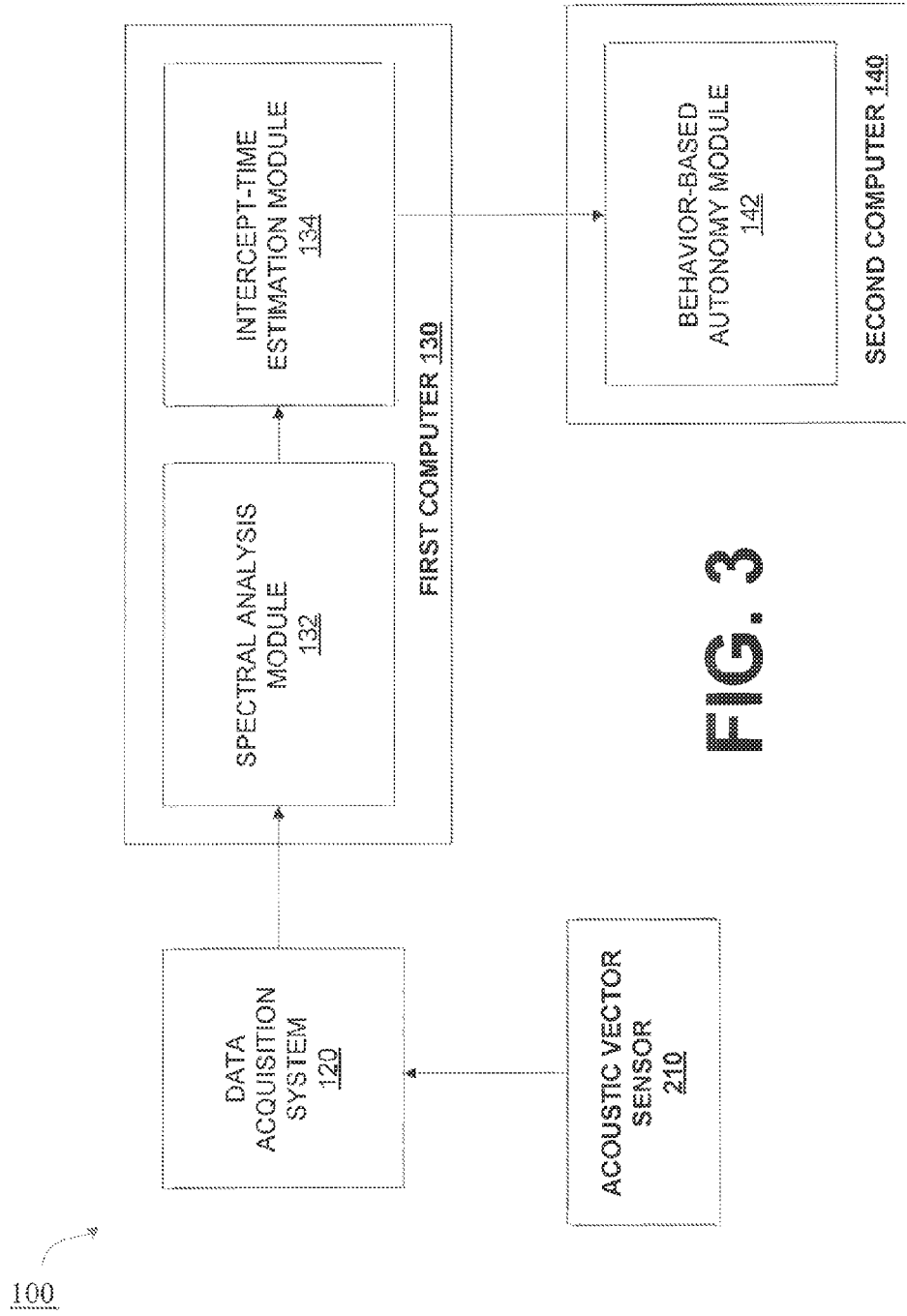
FIG. 3 is a schematic diagram illustrating the collision avoidance system in accordance with a first alternative embodiment of the invention.

In accordance with a first alternative embodiment of the invention, as illustrated by FIG. 3, the hydrophone 110 may be replaced by an acoustic vector sensor 210. In addition to acoustic pressure, the acoustic vector sensor 210 provides a timeseries of the particle motion associated with the acoustic field. This timeseries information allows a bearing estimation module 220 located within the first computer 130 to provide an estimate of the bearing to the surface craft (source), which will then be packed into the NMEA string transmitted to the behavior-based autonomy module 142, allowing for more intelligent evasive action.

In accordance with a second alternative embodiment of the invention, the collision avoidance system 100 may also contain a recognition module for purposes of recognizing the spectral nature of man-made vessels, involving a combination of broadband noise and discrete tones associated with rotating machinery and electrical systems, in contrast to natural noise sources such as storms which are in general broadband in nature. The recognition module then adds the tonal information to the NMEA string for aiding the present system 100 in determining the appropriate evasive action.

It should be noted that instead of having separate modules within computers, such as the spectral analysis module 132, the intercept-time estimation module 134, the behavior-based autonomy module 142, and the bearing estimation module 220, the collision avoidance system 100 may contain a single computer having all modules, or separate modules among a different number of computers. Alternatively, the collision avoidance system 100 may contain separate independent devices, such as a spectral analyzer, and intercept-time estimator, a behavior-based autonomy device, and a bearing estimator.

Figure 4:
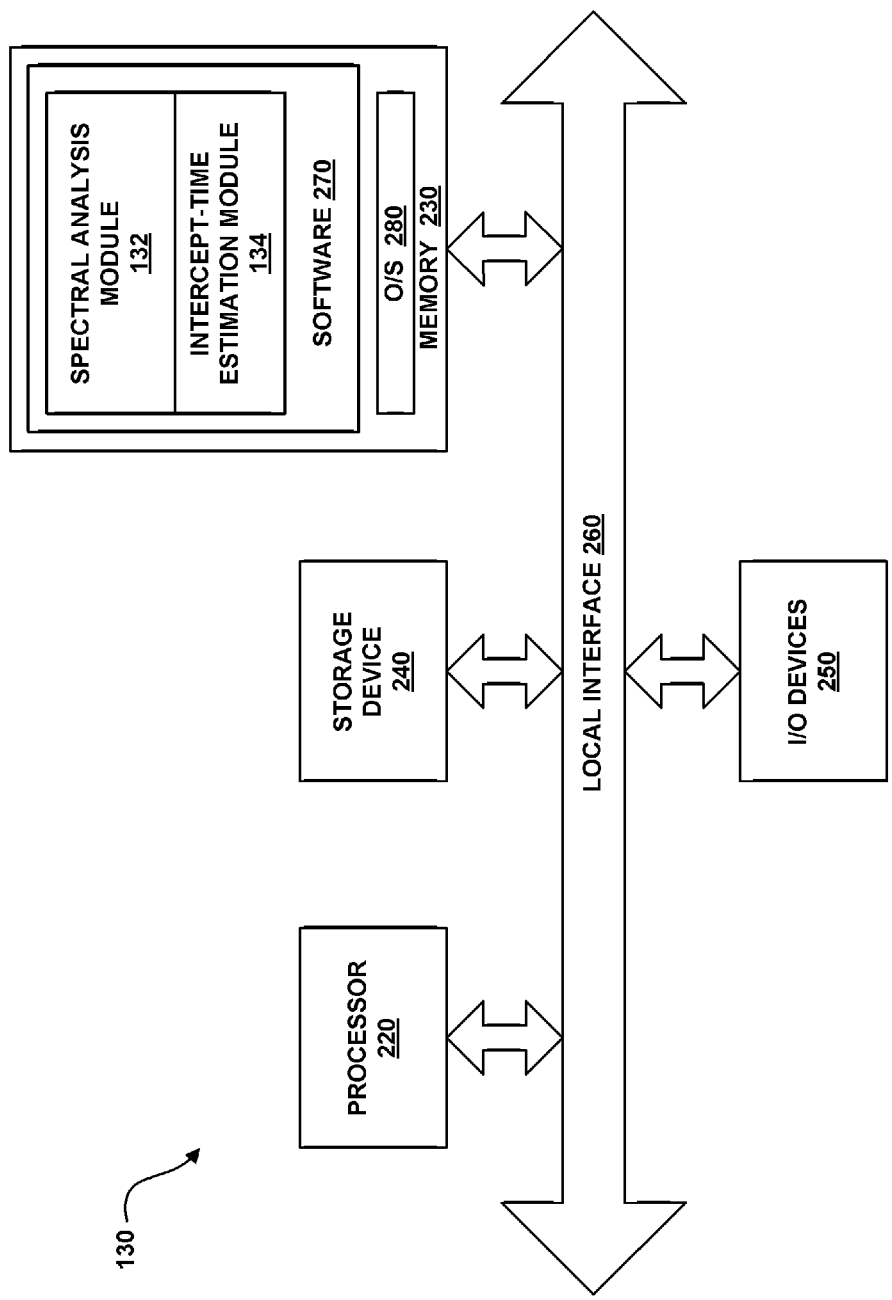
FIG. 4 is a schematic diagram providing an example of computer, such as the first computer of FIG. 2.

It should be noted that computers described herein, such as the first computer 130 and the second computer 140 may contain separate modules, as described hereinabove, wherein each module contains functionality for execution. As previously mentioned, functionality of the present collision detection system 100 and method can be implemented in software, firmware, hardware, or a combination thereof. In the first exemplary embodiment described herein, the collision detection system 100 is provided by one or more special or general-purpose computers. FIG. 4 is a schematic diagram illustrating the first computer 130 in more detail. It should be noted that other computers of the collision detection system 100 have similar components to the first computer 130.

Generally, in terms of hardware architecture, as shown in FIG. 4, the computer 130 includes a processor 220, a memory 230, a storage device 240, and one or more input and/or output (I/O) devices 250 (or peripherals) that are communicatively coupled via a local interface 260. The local interface 260 can be, for example but not limited to, one or more buses or other wired or wireless connections, as is known in the art. The local interface 260 may have additional elements, which are omitted for simplicity, such as controllers, buffers (caches), drivers, repeaters, and receivers, to enable communications. Further, the local interface 260 may include address, control, and/or data connections to enable appropriate communications among the aforementioned components.

The processor 220 is a hardware device for executing software, particularly that stored in the memory 230. The processor 220 can be any custom made or commercially available processor, a central processing unit (CPU), an auxiliary processor among several processors associated with the computer 130, a semiconductor based microprocessor (in the form of a microchip or chip set), a macroprocessor, or generally any device for executing software instructions.

The memory 230 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 230 may incorporate electronic, magnetic, optical, and/or other types of storage media. Note that the memory 230 can have a distributed architecture, where various components are situated remote from one another, but can be accessed by the processor 220.

The software 270 in the memory 30 may include one or more separate programs or modules, each of which comprises an ordered listing of executable instructions for implementing logical functions of the system 100, as described below. In the example of FIG. 4, the software 270 in the memory 230 contains the spectral analysis module 132 and the intercept-time estimation module 134. In addition, the memory 230 may contain an operating system (O/S) 280. The operating system 280 essentially controls the execution of computer programs and provides scheduling, input-output control, file and data management, memory management, and communication control and related services.

The functionality of the first computer 130 may be provided by a source program, executable program (object code), script, or any other entity containing a set of instructions to be performed. When a source program, then the program needs to be translated via a compiler, assembler, interpreter, or the like, which may or may not be included within the memory 230, so as to operate properly in connection with the O/S 280. Furthermore, the first computer 130 can be written as (a) an object oriented programming language, which has classes of data and methods, or (b) a procedure programming language, which has routines, subroutines, and/or functions.

The I/O devices 250 may include input devices, for example but not limited to, a keyboard, mouse, scanner, microphone, or other input device. Furthermore, the I/O devices 250 may also include output devices, for example but not limited to, a printer, display, or other output device. Finally, the I/O devices 250 may further include devices that communicate via both inputs and outputs, for instance, but not limited to, a modulator/demodulator (modem; for accessing another device, system, or network), a radio frequency (RF) or other transceiver, a telephonic interface, a bridge, a router, or other device.

The storage device 240 may be any block data storage device, such as, but not limited to, floppy disks, hard disks or hard drives, optical discs, NAND flash memories, or any storage device capable of maintaining a sequence of bytes or bits having a nominal length (block size).

When the first computer 130 is in operation, the processor 220 is configured to execute the software 270 stored within the memory 230, to communicate data to and from the memory 230, and to generally control operations of the computer 130 pursuant to the software 270. The software 270 and the O/S 280, in whole or in part, but typically the latter, are read by the processor 220, perhaps buffered within the processor 220, and then executed.

When the functionality of the first computer 130 is implemented in software, it should be noted that the functionality can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The functionality of the first computer 130 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the functionality of the first computer 130 is implemented in hardware, the first computer 130 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
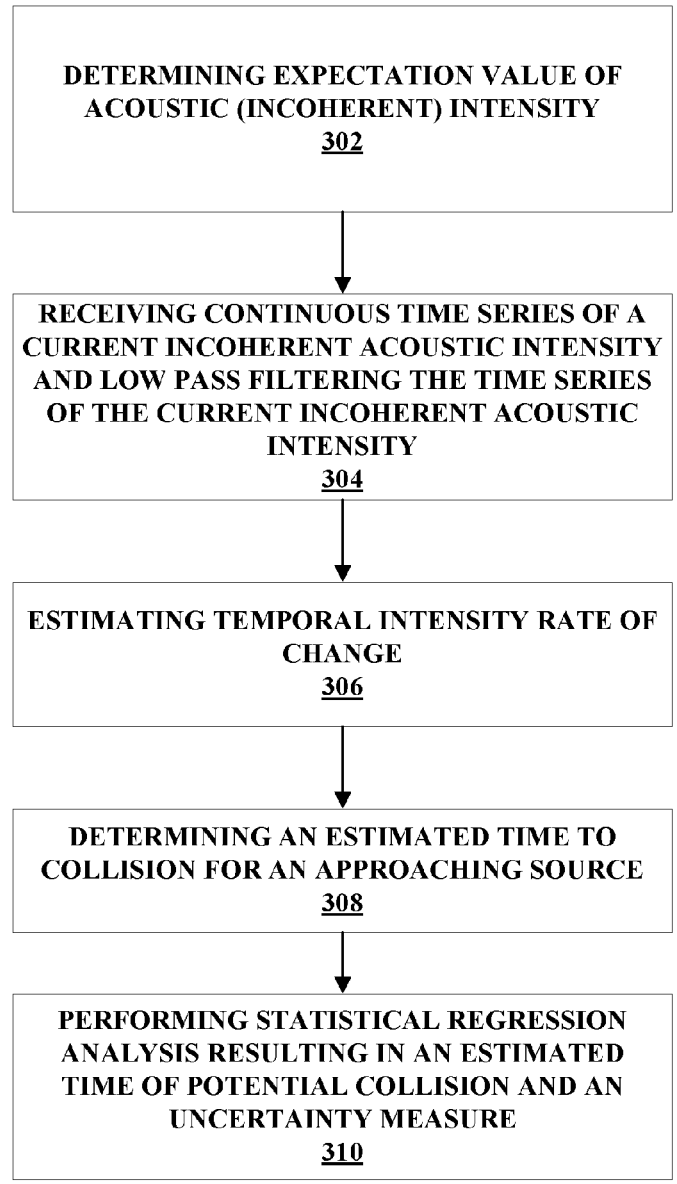
FIG. 5 is a flowchart illustrating a method of providing collision avoidance as performed by the collision avoidance system of FIG. 2.

FIG. 5 is a flowchart 300 illustrating a method of providing collision avoidance in underwater vehicles in accordance with the first exemplary embodiment of the invention. It should be noted that any process descriptions or blocks in flowcharts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 302, the spectral analysis module determines the expectation value of acoustic (incoherent) intensity. The intercept time estimation module then receives continuous time series of the current incoherent acoustic intensity and low pass filters the same (block 304). The intercept time estimation module then estimates temporal intensity rate of change (block 306).

As shown by block 308, the intercept estimation module then determines estimated time to collision for an approaching source. The intercept time estimation module then performs statistical regression analysis resulting in an estimated time of potential collision and an uncertainty measure. As shown by block 310, the behavior-based autonomy module then analyzes estimated collision time and through dedicated behaviors, instructs the AUV to take evasive action.

It should be emphasized that the above-described embodiments of the present invention are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A system for providing collision avoidance in an autonomous underwater vehicle (AUV), comprising:
   a spectral analysis module for determining expectation value of acoustic (incoherent) intensity;
   an intercept time estimation module for:
      receiving continuous time series of a current incoherent acoustic intensity and low pass filtering the time series of the current incoherent acoustic intensity;
      estimating temporal intensity rate of change;
      determining an estimated time to collision for an approaching source; and
      performing statistical regression analysis resulting in an estimated time of potential collision and an uncertainty measure.

2. The system of claim 1, further comprising a behavior-based autonomy module for analyzing estimated collision time and through dedicated behaviors, instructing an autonomous underwater vehicle (AUV) on which the system is located, to take evasive action.

3. The system of claim 1, wherein the temporal intensity rate of change is estimated by use of the equation $$\Delta = \frac{dI_{dB}}{dt} = \frac{\partial I_{dB}}{\partial r}\frac{dr}{dt} = -v^* \frac{\partial I_{dB}}{\partial r} = \frac{10v}{\log(10)r},$$

where r is the range of a source moving toward the underwater vehicle at speed v, and $\Delta$ is the temporal intensity change rate.

4. The system of claim 1, wherein the estimated time to collision for an approaching source dT, is determined by use of the equation $$dT = r/v = \frac{10}{\log(10)\Delta},$$

which states that estimated time to collision with the approaching source is inversely proportional to the time derivative of the current incoherent acoustic intensity.

5. The system of claim 1, wherein the uncertainty measure is a standard deviation.

6. The system of claim 1, wherein the uncertainty measure is a 95% confidence interval.

7. The system of claim 1, further comprising a hydrophone for detecting underwater sound and a data acquisition system for digitizing analog signals received from the hydrophone and generating a digital timeseries.

8. The system of claim 2, wherein taking evasive action is selected from the group consisting of changing depth of the AUV and having the AUV move to a safe zone.

9. The system of claim 8, wherein the safe zone is predefined and stored within the system.

10. The system of claim 2, wherein the AUV contains an AUV survey pattern, and wherein taking evasive action includes modifying and cropping the AUV survey pattern to contain only legs and waypoints outside of an identified no-go zone.

11. The system of claim 2, further comprising a recognition module for recognizing spectral nature of man-made vessels and adding tonal information associated with the recognized spectral nature of man-made vessels, for consideration during taking evasive action.

12. The system of claim 1, wherein the approaching source is a water surface craft.

13. A method of providing collision avoidance in an autonomous underwater vehicle (AUV), comprising the steps of:
   determining expectation value of acoustic (incoherent) intensity;
   receiving continuous time series of a current incoherent acoustic intensity and low pass filtering the time series of the current incoherent acoustic intensity;
   estimating temporal intensity rate of change;
   determining an estimated time to collision for an approaching source; and
   performing statistical regression analysis resulting in an estimated time of potential collision and an uncertainty measure.

14. The system of claim 13, further comprising the step of analyzing estimated collision time and through dedicated behaviors, instructing an autonomous underwater vehicle (AUV) on which the method is provided, to take evasive action.

15. The method of claim 13, wherein the temporal intensity rate of change is estimated by use of the equation $$\Delta = \frac{dI_{dB}}{dt} = \frac{\partial I_{dB}}{\partial r}\frac{dr}{dt} = -v^* \frac{\partial I_{dB}}{\partial r} = \frac{10v}{\log(10)r},$$

where r is the range of a source moving toward the underwater vehicle at speed v, and $\Delta$ is the temporal intensity change rate.

16. The method of claim 13, wherein the estimated time to collision for an approaching source dT, is determined by use of the equation $$dT = r/v = \frac{10}{\log(10)\Delta},$$

which states that estimated time to collision with the approaching source is inversely proportional to the time derivative of the current incoherent acoustic intensity.

17. The method of claim 14, wherein taking evasive action is selected from the group consisting of changing depth of the AUV and having the AUV move to a safe zone.

18. The method of claim 17, wherein the safe zone is predefined and stored.

19. The method of claim 14, wherein taking evasive action includes modifying and cropping an AUV survey pattern to contain only legs and waypoints outside of an identified no-go zone.

20. The method of claim 14, further comprising the step of recognizing spectral nature of man-made vessels and adding tonal information associated with the recognized spectral nature of man-made vessels, for consideration during taking evasive action.

* * * * *